United States Patent
Yoshikawa et al.

(10) Patent No.: US 9,491,030 B2
(45) Date of Patent: Nov. 8, 2016

(54) PHASE ROTATION CORRECTING METHOD AND PHASE ROTATION CORRECTING APPARATUS

(71) Applicant: Panasonic Corporation, Osaka (JP)

(72) Inventors: Hiroyuki Yoshikawa, Tokyo (JP);
Yoshinori Shirakawa, Kanagawa (JP);
Takenori Sakamoto, Kanagawa (JP);
Koichiro Tanaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/607,333

(22) Filed: Jan. 28, 2015

(65) Prior Publication Data
US 2015/0229501 A1   Aug. 13, 2015

(30) Foreign Application Priority Data
Feb. 12, 2014   (JP) .................................. 2014-024272

(51) Int. Cl.
| | | |
|---|---|---|
| *H04B 1/16* | (2006.01) | |
| *H04L 27/38* | (2006.01) | |
| *H04L 27/34* | (2006.01) | |

(52) U.S. Cl.
CPC ....... *H04L 27/3863* (2013.01); *H04L 27/3488* (2013.01)

(58) Field of Classification Search
CPC ........... H04L 27/22; H04L 2027/0067; H04L 25/067; H04L 27/261; H04L 27/38; H04L 27/3872; H04L 1/00; H04L 2027/003; H04L 2027/0036; H04L 2027/0057; H04L 2027/0095; H04L 25/0228; H04L 25/03159; H04L 25/03171; H04L 27/2276

See application file for complete search history.

(56) References Cited

U.S. PATENT DOCUMENTS

| | | | |
|---|---|---|---|
| 2004/0125901 A1* | 7/2004 | Nakahara | H04L 7/041 375/368 |
| 2006/0140310 A1* | 6/2006 | Tashiro | H04L 27/0014 375/329 |
| 2007/0192048 A1* | 8/2007 | Hu | H04L 27/0014 702/69 |
| 2009/0092193 A1* | 4/2009 | Fujita | H04L 27/2647 375/260 |
| 2009/0154590 A1* | 6/2009 | Suzuki | H04L 27/3872 375/286 |
| 2010/0238992 A1 | 9/2010 | Yamagishi | |
| 2014/0140432 A1* | 5/2014 | Weinholt | H04L 5/003 375/269 |

FOREIGN PATENT DOCUMENTS

| | | |
|---|---|---|
| JP | 59-006650 | 1/1984 |
| JP | 2010-220105 | 9/2010 |

* cited by examiner

*Primary Examiner* — Golam Sorowar
(74) *Attorney, Agent, or Firm* — Seed IP Law Group LLP

(57) ABSTRACT

A phase rotation correcting method includes receiving a signal modulated by a multi-value modulation method; recognizing a position of a symbol point of the received signal on an IQ plane; performing phase rotation for rotating a phase of the symbol point of the received signal toward an I axis or a Q axis in accordance with the recognized position and calculating, as an amount of phase rotation correction, a value on an axis different from the axis toward which the phase of the symbol point has been rotated by the phase rotation; and correcting phase rotation of the symbol point by using the calculated amount of phase rotation correction.

8 Claims, 15 Drawing Sheets

PHASE ROTATION CORRECTING METHOD AND PHASE ROTATION CORRECTING APPARATUS

CROSS REFERENCES TO RELATED APPLICATIONS

This application claims priority to Japanese Patent Application No. 2014-024272, filed on Feb. 12, 2014, the contents of which are hereby incorporated by reference.

BACKGROUND

1. Technical Field

The present disclosure relates to a phase rotation correcting method and a phase rotation correcting apparatus that are suitably used in a wireless communication apparatus such as a mobile phone.

2. Description of the Related Art

For example, the techniques disclosed in Japanese Unexamined Patent Application Publication No. 59-006650 and Japanese Unexamined Patent Application Publication No. 2010-220105 are known as techniques for correcting a degradation of transmission path characteristics caused by phasing etc. so as to accurately demodulate received data in a wireless communication apparatus such as a mobile phone.

SUMMARY

However, according to the conventional techniques disclosed in Japanese Unexamined Patent Application Publication No. 59-006650 and Japanese Unexamined Patent Application Publication No. 2010-220105, the amount of phase rotation correction that is needed as a result of a fluctuation of the transmission path characteristics cannot be accurately calculated. It is therefore impossible to accurately demodulate a received signal.

The present disclosure was accomplished in view of the above circumstance and provides a phase rotation correcting method and a phase rotation correcting apparatus that can accurately calculate the amount of phase rotation correction that is needed as a result of a fluctuation of a transmission path and thereby accurately demodulate a received signal.

A phase rotation correcting method according to one aspect of the present disclosure includes: receiving a signal modulated by a multi-value modulation method; recognizing a position of a symbol point of the received signal on an IQ plane; performing phase rotation for rotating a phase of the symbol point of the received signal toward an I axis or a Q axis in accordance with the recognized position and calculating, as an amount of phase rotation correction, a value on an axis different from the axis toward which the phase of the symbol point has been rotated by the phase rotation; and correcting phase rotation of the symbol point by using the calculated amount of phase rotation correction. These general and specific aspects may be implemented using a system, a method, and a computer program, and any combination of systems, methods, and computer programs.

According to the present disclosure, it is possible to accurately calculate the amount of phase rotation correction needed as a result of a fluctuation of a transmission path and to thereby accurately demodulate a received signal.

DETAILED DESCRIPTION

Figure 1:
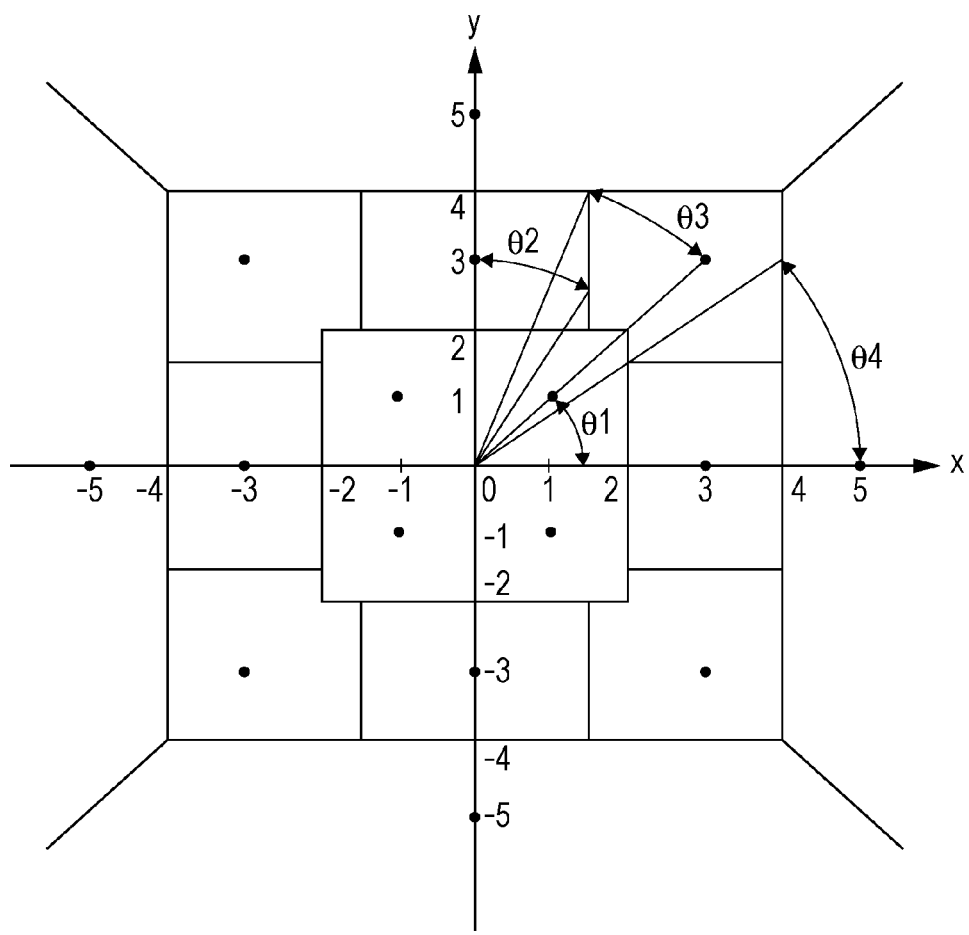
FIG. 1 is a view illustrating a conventional transmission path tracking process described in Japanese Unexamined Patent Application Publication No. 59-006650.

Embodiments of the present disclosure are described below with reference to the drawings.

Background to Accomplishment of One Aspect of the Present Disclosure

In recent years, the volume of data has increased as the quality of electronic apparatuses handling images, sound etc. has improved. Moreover, the volume of data transferred by a communication system is also increasing. In particular, in recent years, wireless communication for high-speed transmission of several Gbps using a millimeter waveband including a 60 GHz band has been considered in order to achieve high-speed transmission of a large volume of data reaching up to several G (giga)bits. For example, in a single carrier transmission system using a millimeter waveband (considered in IEEE802.11ad), a signal that has been PSK (Phase Shift Keying) modulated or QAM (Quadrature Amplitude Modulation) modulated is transmitted at 1.76 G symbol/sec. Note that PSK modulation is a modulation method for transmitting data by changing the phase of a reference signal and includes BPSK, QSPK, 8-PSK, and 16-PSK. On the other hand, the QAM modulation is a modulation method for transmitting data by changing the amplitude of a reference signal and includes 16QAM, 64QAM, and 256QAM.

However, in wireless communication using a millimeter waveband, a degradation of communication quality occurs due to multi-path phasing specific to wireless communication even when a transmission path of a 60 GHz band is used. Furthermore, in short-range (several tens of cm to several m) wireless communication in an indoor environment, a delay wave of several nsec to several tens of nsec occurs due to reflections by walls, ceilings, furniture, fixtures, or nearby human bodies. When a delay wave that is several times to several tens of times longer than a transmission symbol time occurs, inter-symbol interference occurs. This causes a demodulation error.

In general, in a frame format used in the above-mentioned wireless communication, a known signal exists at an arbitrary position. A receiving side demodulates a remaining data part (a part except the known signal) of a packet by performing channel estimation using this known signal. In a case where there is no element such as a time fluctuation in the transmission path, demodulation can be performed by this process. However, in a case where there is an element such as a time fluctuation in the transmission path, actual transmission path characteristics gradually deviate from an estimation result of the start of the packet, and finally it becomes impossible to demodulate the data part. Therefore, a process of tracking the transmission path (transmission path tracking process) is needed when the packet is received.

In order to track the transmission path, a process of providing a known signal (e.g., a pilot signal) not only at the start of the packet, but also at a position other than the start of the packet, and tracking the transmission path by using this known signal is conventionally performed so that a fluctuation of transmission path characteristics can be estimated at appropriate time intervals. For example, Japanese Unexamined Patent Application Publication No. 59-006650 and Japanese Unexamined Patent Application Publication No. 2010-220105 describe a communication system in which no pilot signal is inserted and a transmission path tracking process using not only a pilot signal, but also a signal other than the pilot signal since reception performance cannot be satisfied by a transmission path tracking process using the pilot signal.

FIG. 1 is a view illustrating a conventional transmission path tracking process described in Japanese Unexamined Patent Application Publication No. 59-006650. In FIG. 1, θ1 to θ4 are marginal angles of respective symbol points. Because of differences in the marginal angles of the respective symbol points of a received signal, a symbol point of the best marginal angle (θ1) is used to calculate the amount of phase rotation correction and correct the amount of phase rotation.

Figure 2:
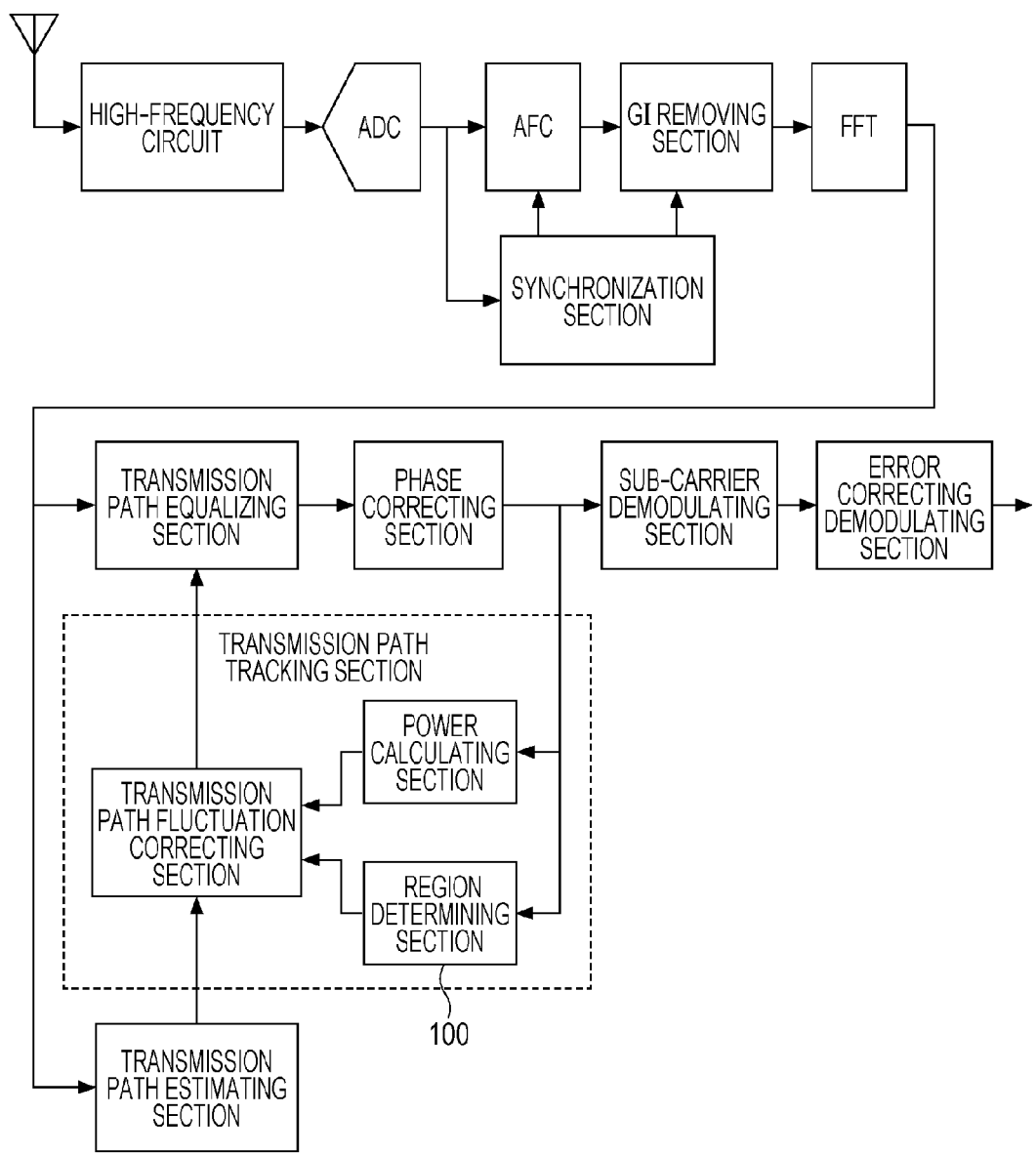
FIG. 2 is a block diagram illustrating an outline configuration of the conventional technique described in Japanese Unexamined Patent Application Publication No. 2010-220105.
Figure 3:
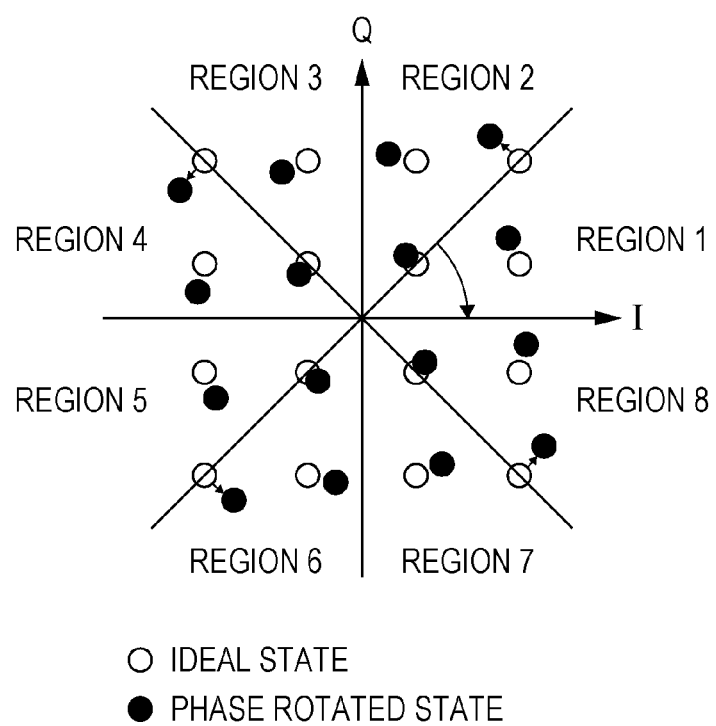
FIG. 3 is a view schematically illustrating a transmission path tracking process of the conventional technique described in Japanese Unexamined Patent Application Publication No. 2010-220105.

FIG. 2 is a block diagram illustrating an outline configuration of the conventional technique described in Japanese Unexamined Patent Application Publication No. 2010-220105. FIG. 3 is a view schematically illustrating a transmission path tracking process of the conventional technique described in Japanese Unexamined Patent Application Publication No. 2010-220105. In the conventional technique described in Japanese Unexamined Patent Application Publication No. 2010-220105, a region determining section 100 in FIG. 2 establishes the presence of received symbols whose phase has been rotated (indicated by the black circles in FIG. 3), finds directions in which the phases of the received symbols are corrected, and corrects the phases by using a certain minute amount of phase rotation correction (fixed value).

In the conventional technique described in Japanese Unexamined Patent Application Publication No. 59-006650, the amount of phase rotation correction is calculated by using a certain symbol point. It is therefore impossible to perform accurate correction. In the conventional technique described in Japanese Unexamined Patent Application Publication No. 2010-220105, correction is performed by using a certain minute amount of phase rotation correction (fixed value). Processing time (calculation time) is required before phase rotation converges. It is therefore impossible to perform accurate correction.

A phase rotation correcting method and a phase rotation correcting apparatus that can accurately calculate the amount of phase rotation correction that is needed as a result of a fluctuation of transmission path characteristics and thereby accurately correct the phase rotation are described below.

Embodiment 1

Figure 4:
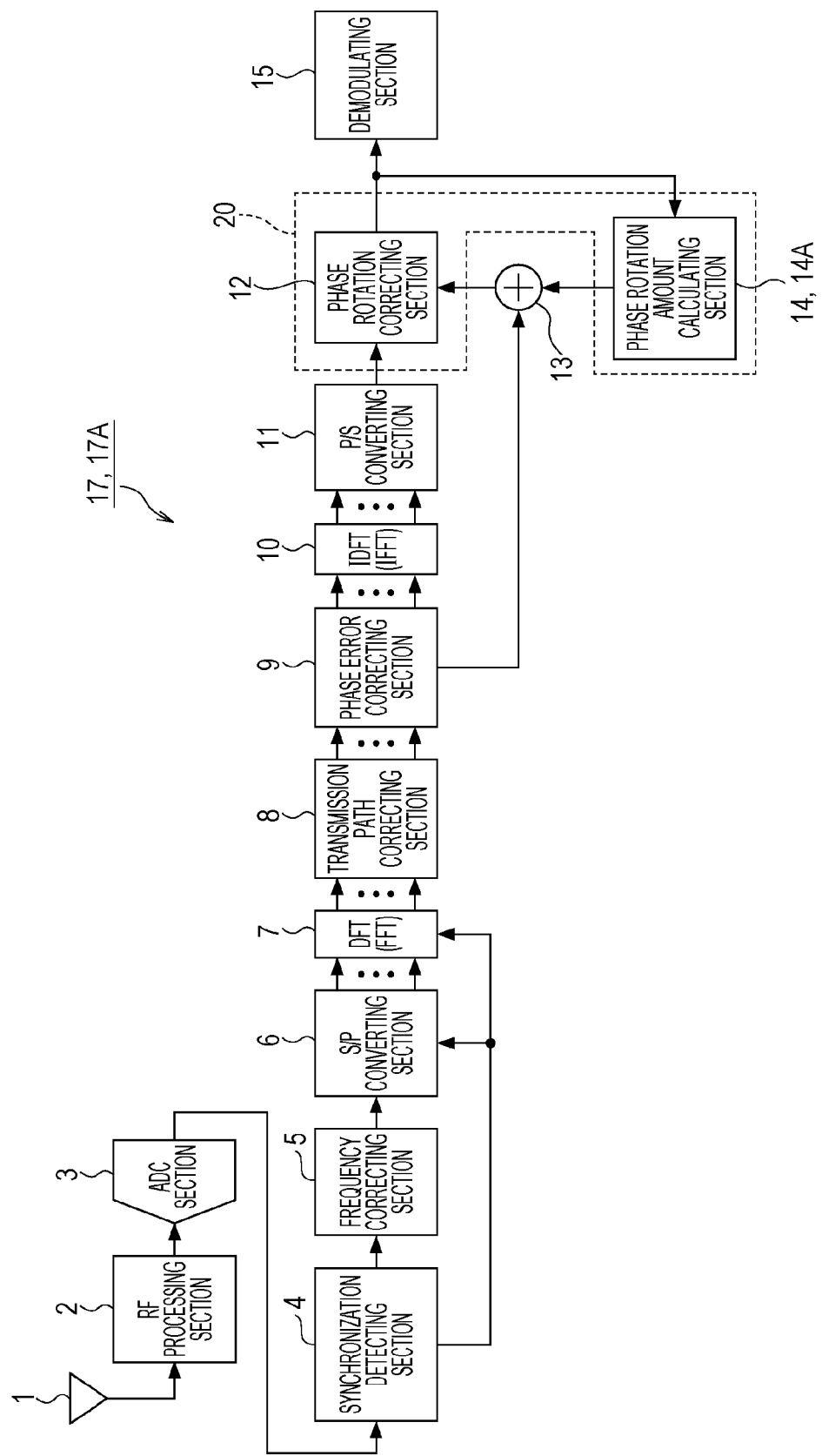
FIG. 4 is a block diagram illustrating an outline configuration of a wireless receiving apparatus according to Embodiment 1.

FIG. 4 is a block diagram illustrating an outline configuration of a wireless receiving apparatus according to Embodiment 1. A wireless receiving apparatus 17 illustrated in FIG. 4 is a wireless receiving apparatus having a single-carrier receiving function and includes a receiving antenna section 1, an RF processing section 2, an ADC (AD converter) section 3, a synchronization detecting section 4, a frequency correcting section 5, an S/P (Serial/Parallel) converting section 6, a Fourier transform (DFT (or FFT)) section 7, a transmission path correcting section 8, a phase error correcting section 9, an inverse Fourier transform (IDFT (or IFFT)) section 10, a P/S (Parallel/Serial) converting section 11, a phase rotation correcting section 12, an adding section 13, a phase rotation amount calculating section 14, and a demodulating section 15. Note that the phase rotation correcting section 12 and the phase rotation amount calculating section 14 constitute a phase rotation correcting apparatus 20.

Figure 5:
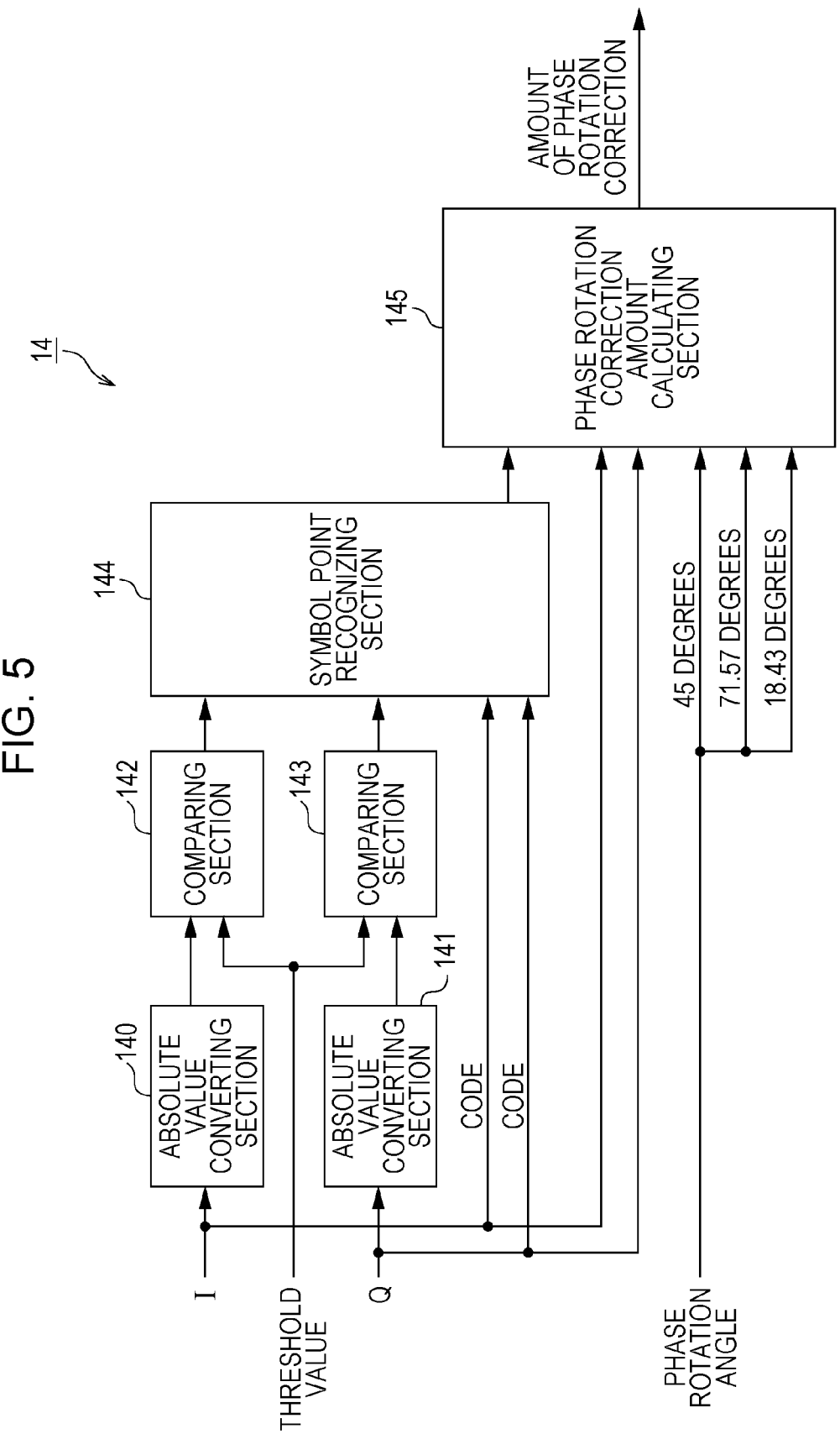
FIG. 5 is a block diagram illustrating an outline configuration of a phase rotation amount calculating section of the wireless receiving apparatus according to Embodiment 1.

FIG. 5 is a block diagram illustrating an outline configuration of the phase rotation amount calculating section 14 of the phase rotation correcting apparatus 20. In FIG. 5, the phase rotation amount calculating section 14 includes an absolute value converting section 140 that converts data of an I axis (an in-phase component) to absolute values, an absolute value converting section 141 that converts data of a Q axis (a quadrature component) to absolute values, a comparing section 142 that compares the absolute values converted from data of the I axis by the absolute value converting section 140 with a threshold value, a comparing section 143 that compares the absolute values converted from the data of the Q axis by the absolute value converting section 141 with a threshold value, a symbol point recognizing section 144 that determines a position of a symbol point on the basis of the comparison results obtained by the comparing section 142 and the comparing section 143 and code signals of an I value and a Q value, and a phase rotation correction amount calculating section 145 that performs phase rotation with respect to the I value and the Q value on the basis of the output result of the symbol point recognizing section 144 and the code signals of the I value and the Q value and that calculates the amount of phase rotation correction. In the case of 16QAM, the phase rotation correction amount calculating section 145 receives data having phase rotation angles of 45 degrees, 71.57 degrees, and 18.43 degrees.

Figure 6:
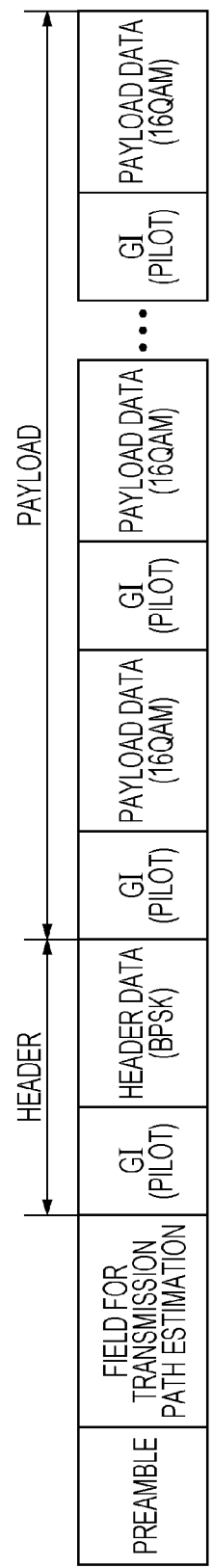
FIG. 6 is a view illustrating an example of a single-carrier frame format used in the wireless receiving apparatus according to Embodiment 1.

FIG. 6 illustrates an example of a single-carrier frame format used in the wireless receiving apparatus 17. The frame format illustrated in FIG. 6 is a format of a received signal received by the receiving antenna section 1 and is constituted by a preamble, a field for channel estimation, a header, and a payload. When the wireless receiving apparatus 17 receives the received signal of this format, the RF processing section 2 amplifies the received signal having a wireless frequency received by the receiving antenna section 1, and converts the received signal into a baseband signal by performing quadrature modulation. The AD converter section 3 samples the baseband signal supplied from the RF processing section 2 and converts the baseband signal into a digital signal. The synchronization detecting section 4 detects a known preamble signal for synchronization from a complex baseband signal converted into the digital signal by the AD converter section 3 and outputs a timing signal for synchronization. The preamble signal is used for window synchronization, that is, symbol synchronization of the DFT section 7.

The frequency correcting section 5 calculates, as a carrier frequency error, a carrier frequency offset by using the known preamble signal, and outputs a complex baseband signal obtained by correcting the carrier frequency offset. The S/P converting section 6 is a buffer for causing the DFT section 7 to operate and converts the complex baseband signal, which is a serial signal, into a parallel signal. The DFT section 7 performs time-frequency conversion of the complex baseband signal in a time domain obtained by correcting the carrier frequency offset by the frequency correcting section 5 in accordance with the timing signal detected by the synchronization detecting section 4, and then outputs the complex signal in a frequency domain.

The transmission path correcting section 8 calculates an amplitude and a phase, which constitute a transmission path error between transmitting receiving apparatuses, by using the known preamble signal to correct the transmission path error. The phase error correcting section 9 calculates a residual carrier frequency offset and a residual symbol synchronization shift by using a known reference signal (e.g. a pilot signal) that is periodically inserted as a specific reference signal, and corrects a phase error caused by the residual symbol synchronization shift in the frequency domain. The IDFT section 10 converts a frequency signal which is an output signal of the phase error correcting section 9 into a complex baseband signal in the time domain. The P/S converting section 11 converts a parallel signal, which is an output of the IDFT section 10, into a serial signal. The phase rotation correcting section 12 corrects phase rotation in the time domain by using a result of addition, by the adding section 13, of the estimated value of the residual carrier frequency offset calculated by the phase error correcting section 9 and the amount of phase rotation correction calculated by the phase rotation amount calculating section 14. The phase rotation amount calculating section 14 calculates the amount of phase rotation correction on the basis of the output of the phase rotation correcting section 12. The demodulating section 15 demodulates a digitally-modulated signal which is a complex baseband signal after phase rotation correction converted into a time domain so as to obtain received data.

Figure 7B:
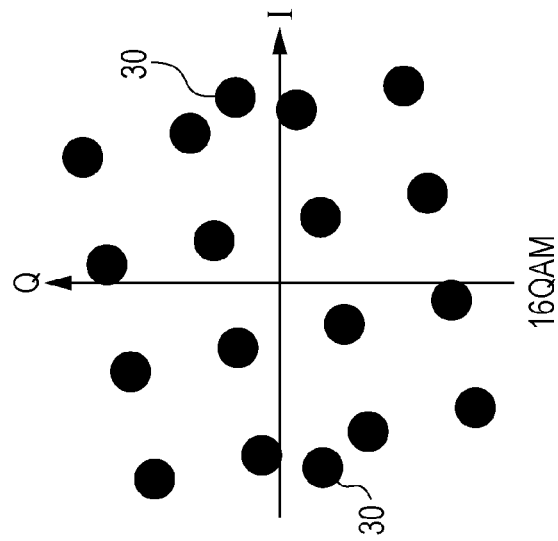
FIGS. 7A and 7B are mapping diagrams of a pilot signal and data (16QAM).
Figure 7A:
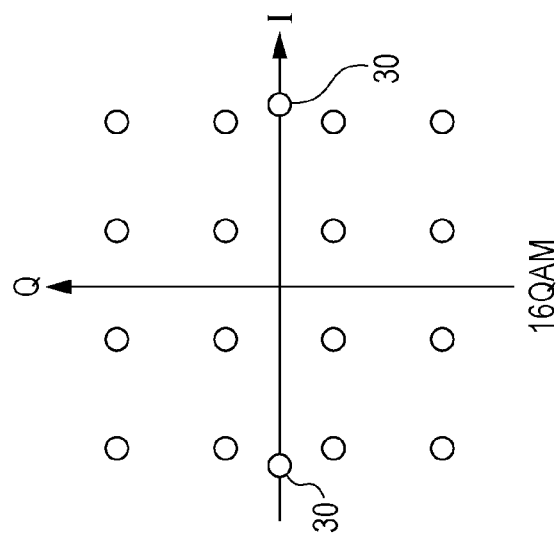

Next, operation of the phase rotation amount calculating section 14 of the phase rotation correcting apparatus 20 is described. FIGS. 7A and 7B are mapping diagrams of a pilot signal (BPSK-modulated) and a data signal (16QAM-modulated). That is, FIGS. 7A and 7B are diagrams illustrating a symbol point of the payload in FIG. 6. A transmitting side transmits a pilot signal and a data signal at symbol points indicated by the white circles in FIG. 7A, but a receiving side receives the pilot signal and the data signal in a state in which the phase of each symbol point is rotated, as indicated by the black circles in FIG. 7B, due to phasing etc. In such a case where a phase rotation shift occurs, the phase rotation shift is conventionally calculated by using a pilot signal (BPSK) 30 inserted at the start of the data. Then, a degradation of communication quality is prevented by performing phase rotation correction also on a data signal other than the pilot signal 30 on the basis of the calculation result. However, correction cannot be sufficiently performed just by phase rotation correction using the pilot signal 30. It is therefore necessary to perform phase rotation correction by using payload data (16QAM). The following describes calculation of the amount of phase rotation by taking reception of 16QAM as an example.

Figure 8:
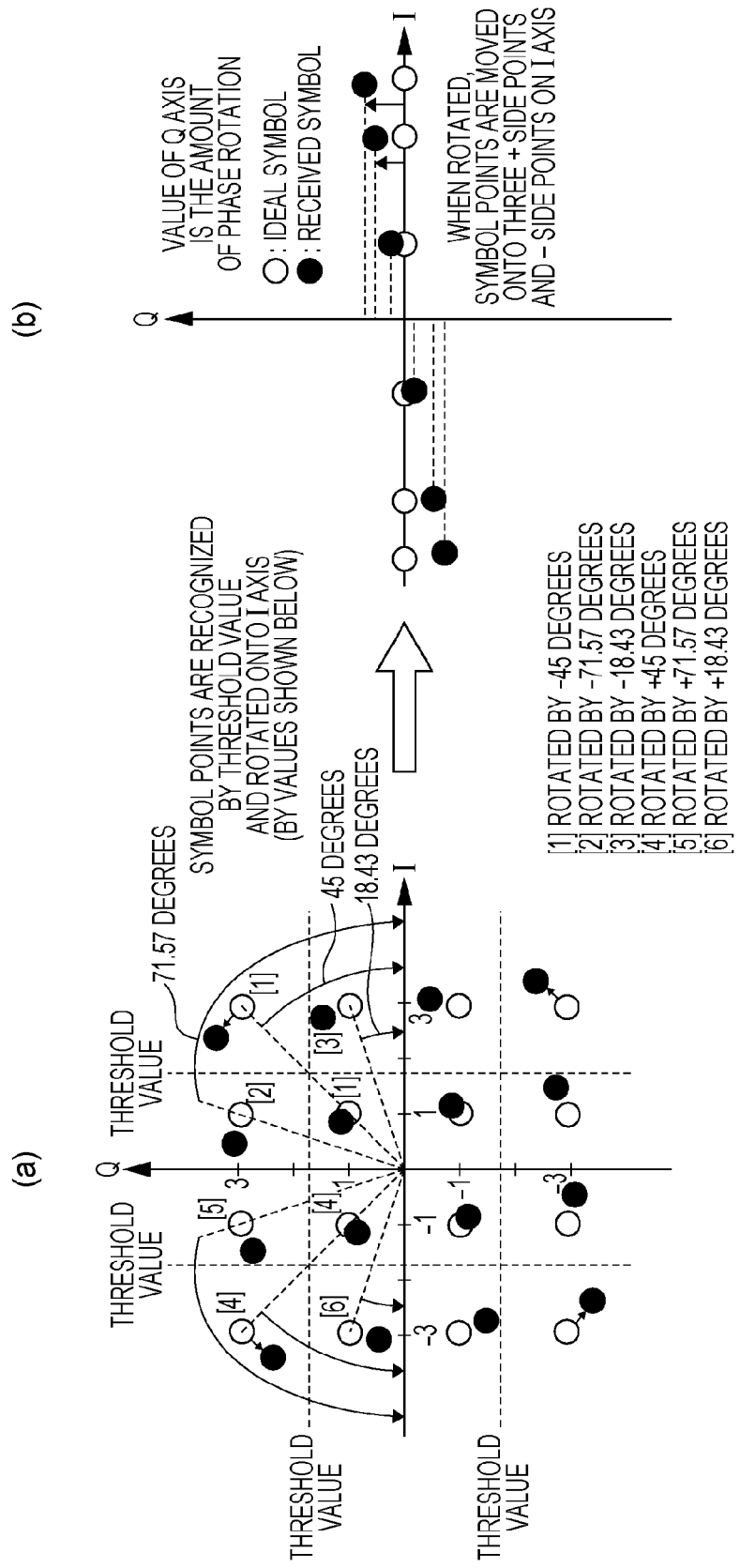
FIG. 8 is a view for explaining phase rotation of a phase rotation correction amount calculating section of the wireless receiving apparatus according to Embodiment 1.

FIG. 8 is a view for explaining phase rotation by the phase rotation correction amount calculating section 145 illustrated in FIG. 5. FIG. 8 is a view illustrating plotting of ideal symbol points (white circles) and actual symbol points (black circles) of 16QAM are plotted on an IQ plane, which illustrates a state in which a specific phase rotation shift has occurred. The absolute value converting section 140 illustrated in FIG. 5 converts an I signal of a received symbol point to an absolute value, and the absolute value converting section 141 converts a Q signal of a received symbol point to an absolute value. The comparing section 142 compares the absolute value of the I signal of the received symbol point with a threshold value. Meanwhile, the comparing section 143 compares the absolute value of the Q signal with a threshold value. Then, the symbol point recognizing section 144 recognizes the position of the symbol point on the basis of the two comparison results and I and Q code signals. Then, the phase rotation correction amount calculating section 145 performs phase rotation as expressed by expression (1) with respect to the symbol point in accordance with the position of the symbol point so as to rotate a phase of the symbol point toward the I axis.

$$I_{out} = I_{in} \times \cos\theta - Q_{in} \times \sin\theta, Q_{out} = I_{in} \times \sin\theta + Q_{in} \times \cos\theta \quad \text{expression (1)}$$

In FIG. 8(a), a plurality of regions divided by the I axis, the Q axis, and the three dotted lines in the first and second quadrants corresponds to any of regions (1) to (6). In a case where the position of a symbol point is within the region (1) in FIG. 8(a), the symbol point is rotated by −45 degrees; in a case where the position of the symbol point is within the region (2) in FIG. 8(a), the symbol point is rotated by −71.57 degrees; and in a case where the position of the symbol point is within the region (3) in FIG. 8(a), the symbol point is rotated by −18.43 degrees. In a case where the position of the symbol point is within the region (4), the symbol point is rotated by 45 degrees; in a case where the position of the symbol point is within the region (5), the symbol point is rotated by 71.57 degrees; and in a case where the position of the symbol point is within the region (6), the symbol point is rotated by 18.43 degrees. Phases of all of the symbol points are thus rotated onto the I axis, as illustrated in FIG. 8(b).

Figure 9:
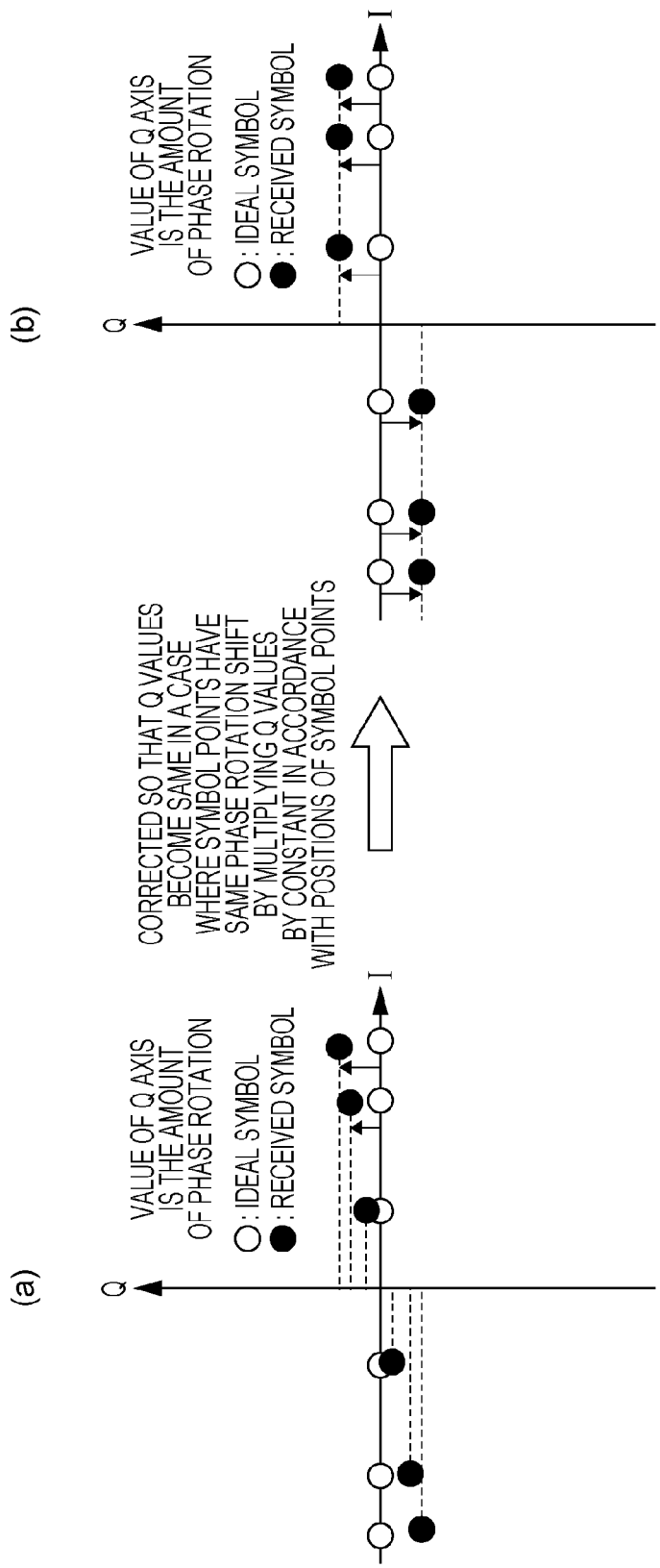
FIG. 9 is a view for explaining a phase rotation amount output of the phase rotation correction amount calculating section of the wireless receiving apparatus according to Embodiment 1.

In a case where a symbol point of the received symbol is in an ideal state, the symbol point whose phase has been rotated is located on the I axis. In this case, the Q value of the symbol point whose phase has been rotated is 0 (the white circles in FIG. 8(b)). However, in a case where the symbol point of the received symbol has a phase rotation shift, the symbol point whose phase has been rotated is not located on the I axis, and therefore the Q value of the symbol point whose phase has been rotated is not 0 (the black circles in FIG. 8(b)). Therefore, the phase rotation correction amount calculating section 145 calculates, as the amount of phase rotation correction, the Q value of the received symbol obtained after the phase rotation. Note that even in a case where received symbols have the same phase rotation shift, a distance between a symbol point of each of the received symbols and an ideal symbol point varies depending on the position of the symbol point in the I axis direction. Therefore, as illustrated in FIG. 9, the amount of phase rotation correction can be made uniform irrespective of the position of a symbol point in the I axis direction by multiplying (weighting) a Q value by a certain constant in accordance with the position of the symbol point in the I axis direction. FIG. 9 is a view for explaining the phase rotation amount output by the phase rotation correction amount calculating section 145.

The amount of phase rotation correction calculated by the phase rotation amount calculating section 14 in FIG. 4 is added by the adding section 13 to the residual carrier frequency offset value calculated by the phase error correcting section 9, and the added value is supplied to the phase rotation correcting section 12, in which phase rotation correction is performed.

Figure 10:
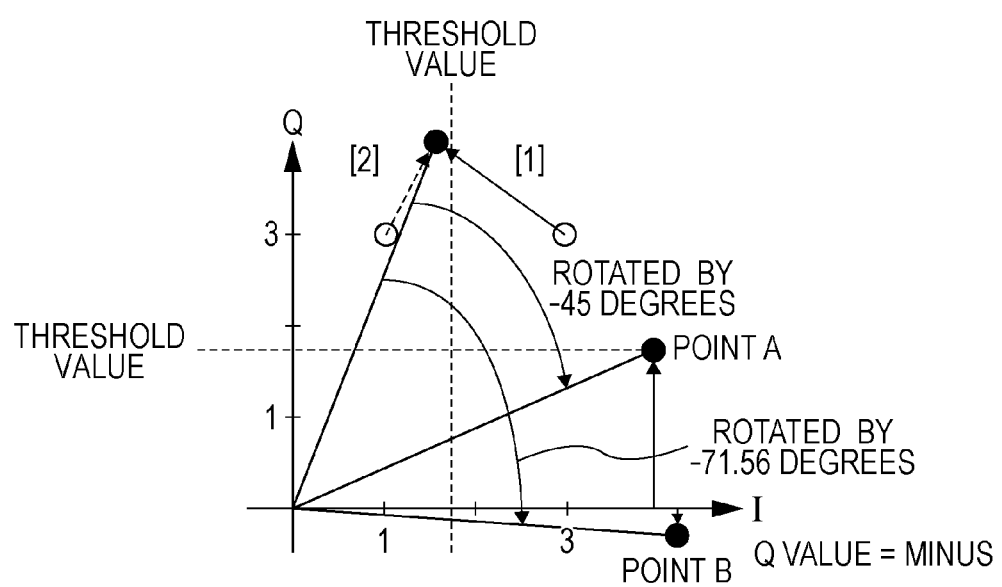
FIG. 10 is a view for explaining erroneous judgment of the phase rotation correction amount calculating section of the wireless receiving apparatus according to Embodiment 1.

Next, erroneous judgment of the phase rotation correction amount calculating section 145 in FIG. 5 is described. FIG. 10 is a view for explaining erroneous judgment of the phase rotation correction amount calculating section 145. FIG. 10 illustrates an example in which a symbol point indicated by the black circle has been recognized as a symbol point within the region (2) because the Q value of the symbol point is lower than a threshold value, even though the symbol point should be recognized as a symbol point within the region (1). Since the signal is originally a signal within the region (1), the Q value of the point A that has been rotated by −45 degrees should correctly be the amount of phase rotation correction. However, since the signal has been recognized as a signal within the region (2), the Q value of the point B (the Q value is a negative value) that has been rotated by −71.56 degrees is output as the amount of phase rotation correction. With regard to such a sharply changed signal, an obtained value is neglected so that an erroneous judgment result does not affect phase rotation correction.

Figure 11:
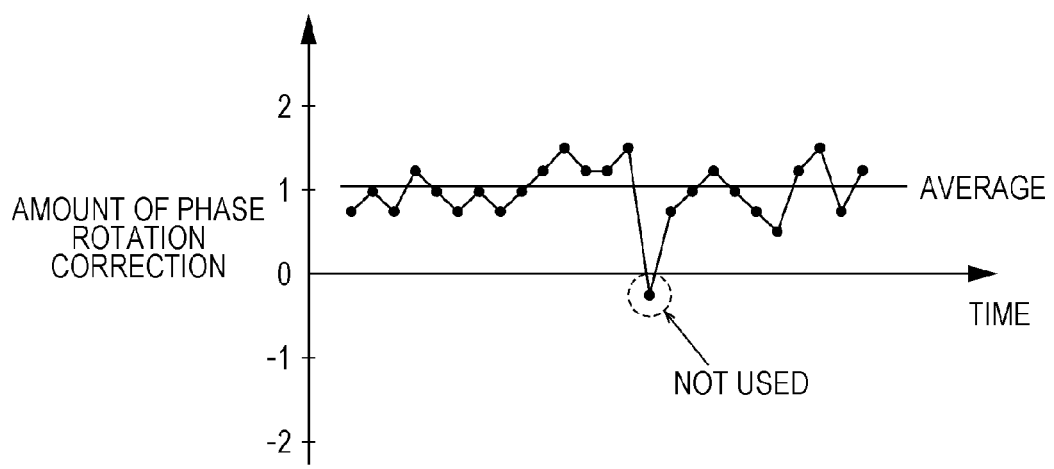
FIG. 11 is a view plotting, on a time axis, an output value of the phase rotation correction amount calculating section of the wireless receiving apparatus according to Embodiment 1.

FIG. 11 is a view illustrating plotted output values (the amounts of the phase rotation correction) of the phase rotation correction amount calculating section 145 in the time axis direction. As illustrated in FIG. 11, in a case where the amount of phase rotation correction has changed sharply, it is determined that erroneous judgment has occurred, and an obtained value is not used. Note that by using an average value of the amounts of phase rotation correction, phase rotation correction can be smoothly performed.

Figure 12:
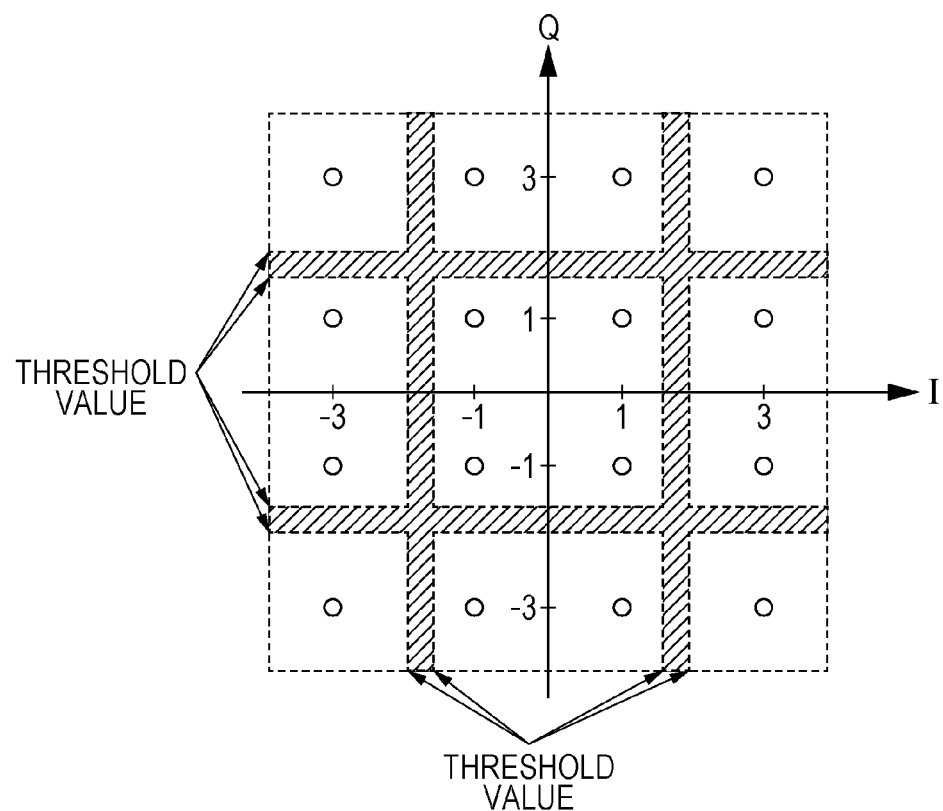
FIG. 12 is a view illustrating an example of setting of a threshold value of the phase rotation correction amount calculating section of the wireless receiving apparatus according to Embodiment 1.

With regard to a threshold value, the amount of phase rotation correction varies depending on the position of the symbol point even though the symbol points are rotated by the same angle as illustrated in FIG. 12. Therefore, it is also possible to provide a threshold value for each symbol point so that the amount of phase rotation correction can be calculated evenly or to provide a region (the shaded portion in FIG. 12) that is neglected so that erroneous judgment does not occur. FIG. 12 is a view illustrating an example of setting of a threshold value of the phase rotation correction amount calculating section 145 in FIG. 5.

The amount of phase rotation correction thus calculated is converted to a rotation angle using tan θ by the phase rotation correcting section 12 in FIG. 4. Then, phase rotation correction is performed by using expression (1), and the correction result is supplied to the demodulating section 15. The demodulating section 15 performs demodulation processing on the payload data that has been subjected to phase rotation correction. Therefore, accurate demodulation can be performed.

As described above, according to the wireless receiving apparatus 17 according to Embodiment 1, it is possible to accurately calculate the amount of phase rotation correction that is needed as a result of a fluctuation of a transmission path and to thereby accurately demodulate received data.

Embodiment 2

Figure 13:
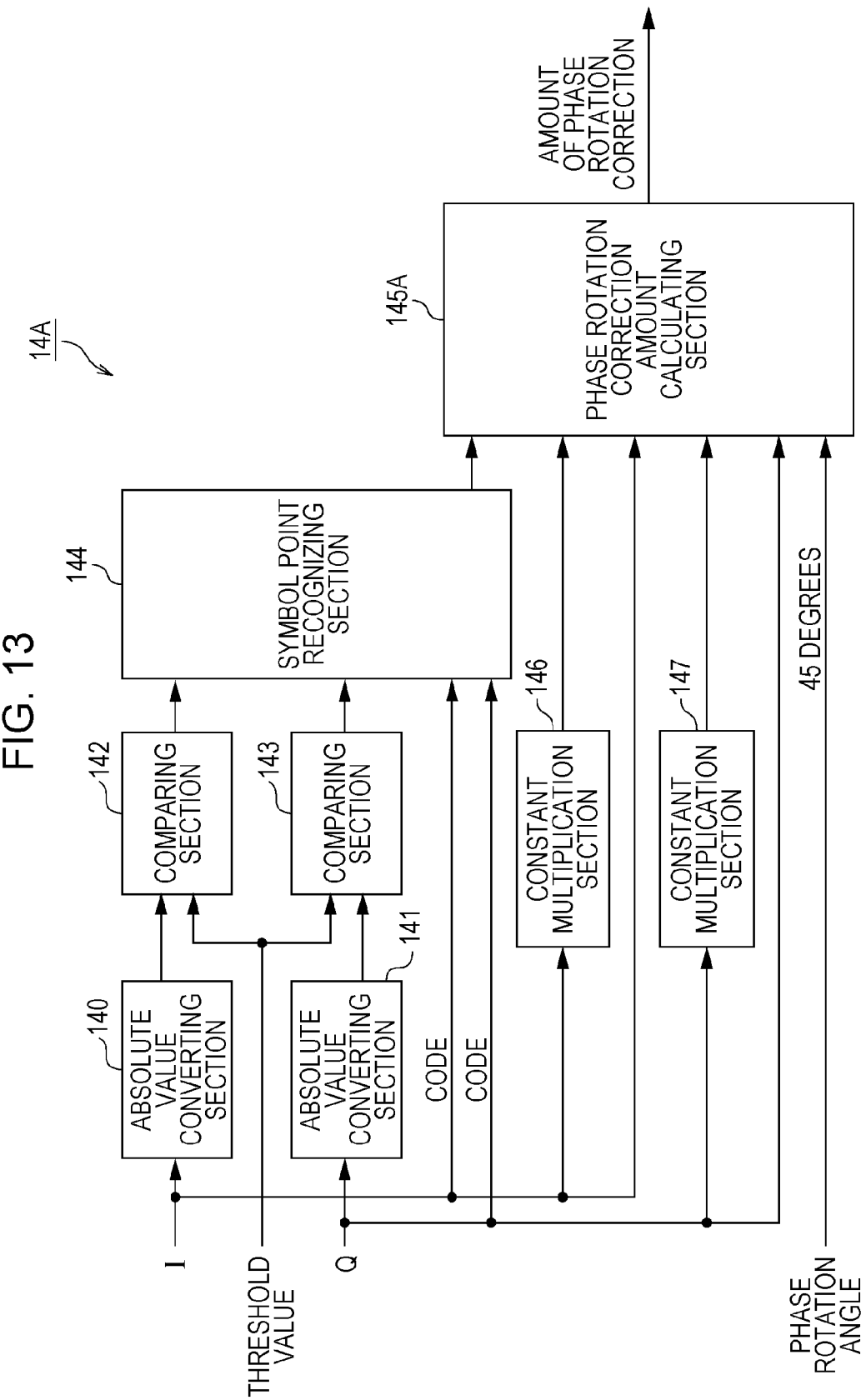
FIG. 13 is a block diagram illustrating an outline configuration of a phase rotation amount calculating section of a wireless receiving apparatus according to Embodiment 2.

FIG. 13 is a block diagram illustrating an outline configuration of a phase rotation amount calculating section of a wireless receiving apparatus according to Embodiment 2. Note that the outline configuration of the wireless receiving apparatus according to Embodiment 2 is identical to that of the wireless receiving apparatus 17 of Embodiment 1 described above although some functions of the wireless receiving apparatus according to Embodiment 2 are different from those of the wireless receiving apparatus 17 of Embodiment 1. Therefore, FIG. 4 given the reference numeral "17A" is referred to. Members of a phase rotation amount calculating section 14A illustrated in FIG. 13 that are identical to those of the phase rotation amount calculating section 14 of the wireless receiving apparatus 17 according to Embodiment 1 are given identical reference numerals.

In FIG. 13, the phase rotation amount calculating section 14A includes members that are similar to the absolute value converting sections 140 and 141, the comparing sections 142 and 143, and the symbol point recognizing section 144 of the phase rotation amount calculating section 14, and includes a constant multiplication section 146 that multiplies an I value by a constant, a constant multiplication section 147 that multiplies a Q value by a constant, and a phase rotation correction amount calculating section 145A that performs phase rotation of 45 degrees with respect to the I value and the Q value that have been multiplied by the constant on the basis of an output result of the symbol point recognizing section 144 and that calculates the amount of phase rotation correction. Data of a phase rotation angle of 45 degrees is input to the phase rotation correction amount calculating section 145A.

Figure 14:
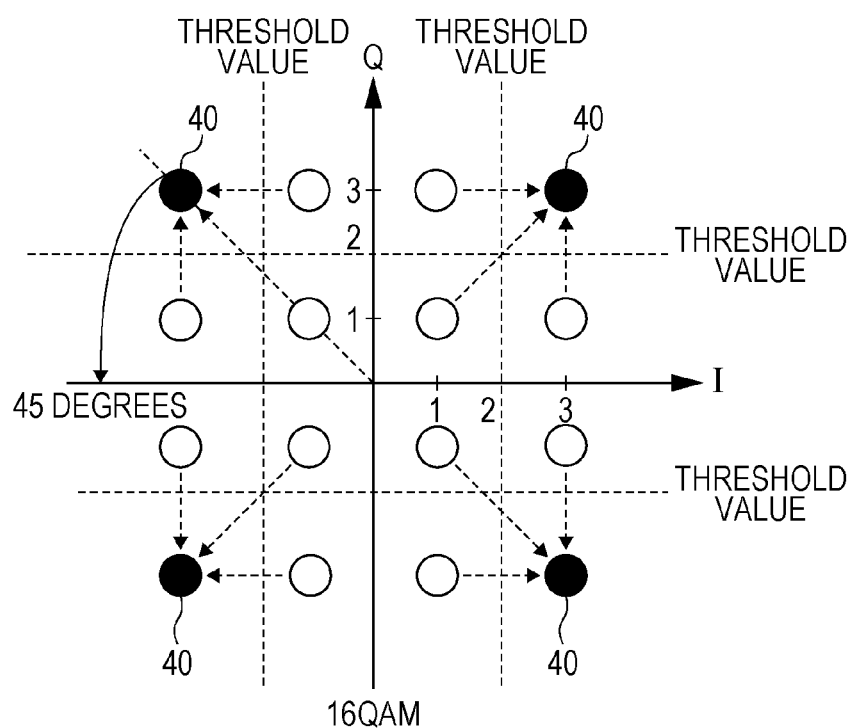
FIG. 14 is a view for explaining operation of the phase rotation correction amount calculating section of the wireless receiving apparatus according to Embodiment 2.

Next, operation of the phase rotation amount calculating section 14A is described in more detail. FIG. 14 is a view for explaining operation of the phase rotation correction amount calculating section 145A of the phase rotation amount calculating section 14A. That is, FIG. 14 is a view illustrating mapping of symbol points of 16QAM on an IQ plane. This is described below by taking four points in the first quadrant as an example. The four symbol points within the first quadrant are mapped at (1, 1), (3, 1), (1, 3), and (3, 3), respectively. Assume that a threshold value is a midpoint, i.e., 2. In this case, in a case where at least one of the I value and the Q value is not more than the threshold value, a phase of a symbol point can be rotated onto an outside point (a certain point) 40 by multiplying the I value which is not more than the threshold value or the Q value which is not more than the threshold value by 3. A phase of a symbol point can be rotated onto an outside point (a certain point) 40 by performing similar processing also with respect to the second, third, and fourth quadrants. Since the symbol points can be rotated onto the I axis when the outside points (four points in total) 40 are rotated by 45 degrees, the phase rotation correction amount calculating section 145A can be realized on a smaller scale. Note that processing after rotation to the outside four points is the same as that of Embodiment 1.

Embodiment 3

Figure 15:
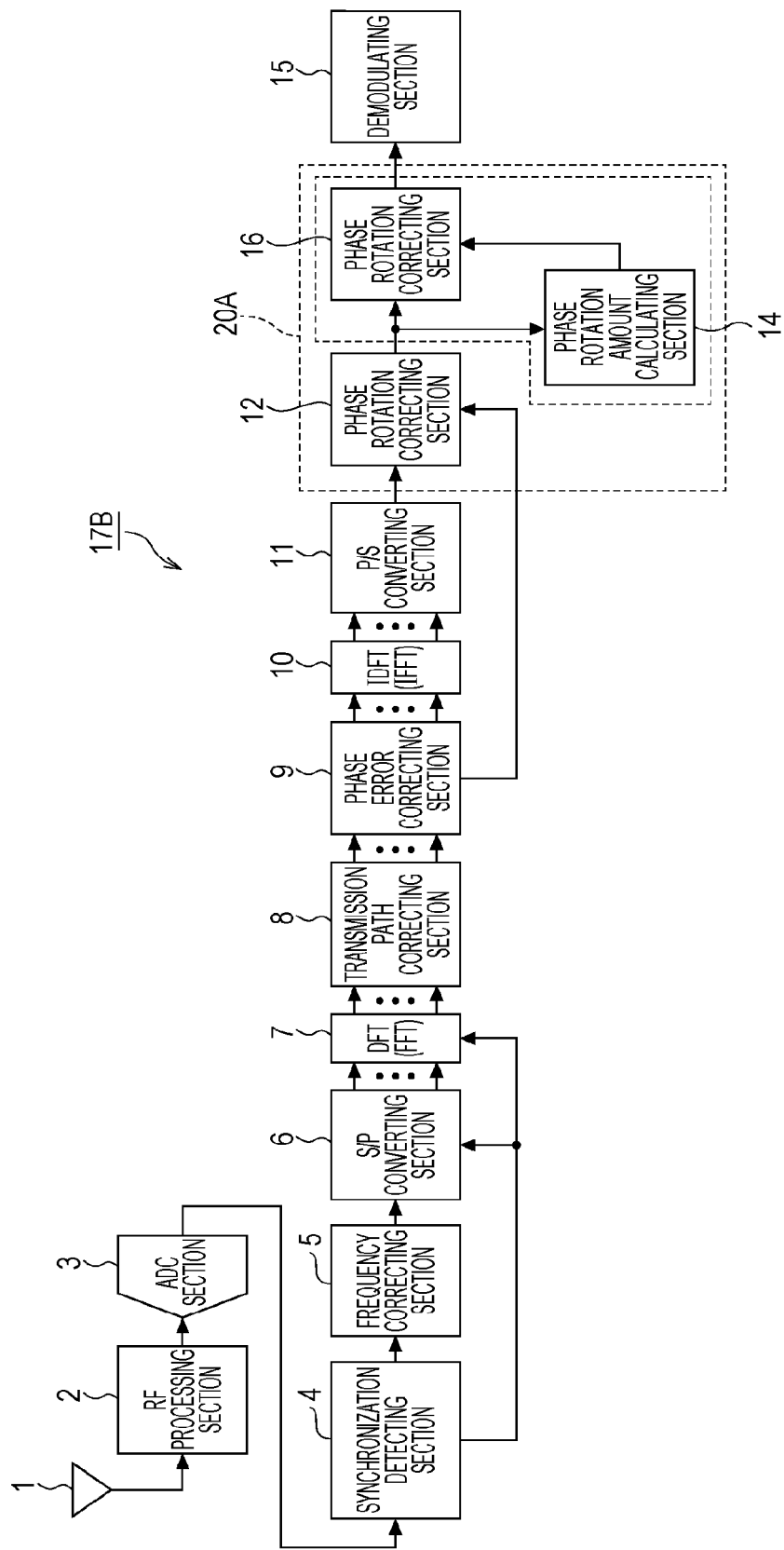
FIG. 15 is a block diagram illustrating an outline configuration of a wireless receiving apparatus according to Embodiment 3.

FIG. 15 is a block diagram illustrating an outline configuration of a wireless receiving apparatus according to Embodiment 3. FIG. 15 illustrates, as an example, a configuration of a wireless receiving apparatus that has a single-carrier receiving function. Note that, in FIG. 15, members that are identical to those in FIG. 4 are given identical reference numerals. As illustrated in FIG. 15, a wireless receiving apparatus 17B according to Embodiment 3 includes a receiving antenna section 1, an RF processing section 2, an AD converter section 3, a synchronization detecting section 4, a frequency correcting section 5, an S/P converting section 6, a Fourier transform (DFT (or FFT)) section 7, a transmission path correcting section 8, a phase error correcting section 9, an inverse Fourier transform (IDFT (or IFFT)) section 10, a P/S converting section 11, a phase rotation correcting section 12, a phase rotation amount calculating section 14, a demodulating section 15, and a phase rotation correcting section 16.

A difference between the wireless receiving apparatus 17 in FIG. 4 and the wireless receiving apparatus 17B in FIG. 15 is that the wireless receiving apparatus 17 has a single phase rotation correcting section 12, whereas the wireless receiving apparatus 17B has two phase rotation correcting sections 12 and 16. Another difference is that, in the wireless receiving apparatus 17B, the portion surrounded by dotted line in FIG. 12 is not a feedback type but a feedforward type. According to the feedback type, in a case where the wireless receiving apparatus 17 is realized by hardware, it takes several clocks before phase rotation correction, and therefore correction cannot be started from the start of data. Meanwhile, according to the feedforward type, in a case where the wireless receiving apparatus 17B, phase rotation correction can be started from the start of data by adjusting a timing. Note that the phase rotation correcting sections 12 and 16 and the phase rotation amount calculating section 14 constitute the phase rotation correcting apparatus 20A.

The embodiments have been described so far with reference to the drawings, but it is needless to say that the present disclosure is not limited to these example. It is apparent that a person skilled in the art can think of various variations and modifications within the scope of the claim, and it is understood that such variations and modifications are also encompassed within the technical scope of the present disclosure. Furthermore, the constituent elements in the above embodiments may be combined in any way as long as such a combination is not deviated from the purpose of the present disclosure.

In each of the above embodiments, an example in which the present disclosure is realized by way of hardware. However, the present disclosure can also be realized by software in association with hardware.

The functional blocks used for description of the above embodiments are typically realized as an LSI (Large Scale Integration), which is an integrated circuit. The functional blocks may be individually chipped or part or all of the functional blocks may be collectively chipped. Here, the term "LSI" is used, but terms "IC", "system LSI", "super LSI", and "ultra LSI" may be used depending on the degree of integration. Furthermore, a method for realizing the integrated circuit is not limited to LSI, but the integrated circuit may be realized by a dedicated circuit or a general-purpose processor. An FPGA (Field Programmable Gate Array) that can be programmed after production of an LSI or a reconfigurable processor in which connection and settings of a circuit cell in the LSI can be reconfigured may be used. Furthermore, if other techniques for achieving an integrated circuit that take the place of LSI appear as a result of the progress or derivation of the semiconductor technique, it is of course possible to realize integration of functional blocks by using such other techniques. One possibility is application of a biotechnology etc.

Note that the present disclosure can be expressed as a carrier recovery method executed in a wireless communication apparatus. Furthermore, the present disclosure can also be expressed as a carrier recovery apparatus that has a function of executing the carrier recovery method, a phase rotation correcting method, or a program for causing a phase rotation correcting apparatus to operate by a computer. That is, the present disclosure can be expressed by any of the categories: apparatus, method, and program.

Outline of One Aspect of Present Disclosure

A first phase rotation correcting method of the present disclosure includes receiving a signal modulated by a multi-value modulation method; recognizing a position of a symbol point of the received signal on an IQ plane; performing phase rotation for rotating a phase of the symbol point of the received signal toward an I axis or a Q axis in accordance with the recognized position and calculating, as an amount of phase rotation correction, a value on an axis different from the axis toward which the phase of the symbol point has been rotated by the phase rotation; and correcting the phase rotation of the symbol point by using the calculated amount of phase rotation correction.

A second phase rotation correcting method of the present disclosure is the first phase rotation correcting method in which the recognizing is performed by comparing an absolute value of an I value of the symbol point with a threshold value and by comparing an absolute value of a Q value of the symbol point with the threshold value; and in the calculating includes multiplying the Q value of the symbol point whose phase has been rotated by a constant in accordance with a position of the symbol point whose phase has been rotated in an I axis direction, and obtaining a multiplication result as the amount of phase rotation correction.

A third phase rotation correcting method of the present disclosure is the first phase rotation correcting method wherein when the calculated amount of phase rotation correction is out of a certain range the calculated amount of phase rotation correction that is out of the certain range is not used in the correcting step.

A fourth phase rotation correcting method of the present disclosure is the first phase rotation correcting method in which, the calculating includes averaging the calculated amount of phase rotation correction.

A fifth phase rotation correcting method of the present disclosure is the first phase rotation correcting method wherein: the recognizing of the position of the symbol point of the received signal on the IQ plane is performed by using a threshold value, and the phase rotation includes multiplying an amplitude of the symbol point by a certain number in accordance with the recognized position; and rotating the symbol point with the multiplied amplitude toward the I axis or the Q axis.

A phase rotation correcting apparatus of the present disclosure includes a receiving section that receives a signal modulated by a multi-value modulation method; a symbol point recognizing section that recognizes a position of a symbol point of the received signal on an IQ plane; a phase rotation correction amount calculating section that performs phase rotation for m rotating a phase of the symbol point of the received signal toward an I axis or a Q axis in accordance with the recognized position and calculates, as an amount of phase rotation correction, a value on an axis different from the axis onto which the phase of the symbol point has been rotated by the phase rotation; and a phase rotation correcting section that corrects the phase rotation of the symbol point by using the calculated amount of phase rotation correction.

INDUSTRIAL APPLICABILITY

The present disclosure is useful, for example, for a wireless communication apparatus that performs high-speed transmission.

What is claimed is:

1. A phase rotation correcting method implemented in a wireless communication apparatus, the method comprising:
   receiving, via an RF receiver, a signal modulated by a multi-value modulation method;
   recognizing a position of a symbol point of the received signal on an IQ plane;
   performing phase rotation by rotating a phase of the symbol point of the received signal toward one of an I axis and a Q axis depending on the recognized position, and calculating an amount of phase rotation correction as a value along an axis different from the axis toward which the phase of the symbol point has been rotated in the phase rotation;
   correcting the phase rotation of the symbol point based on the calculated amount of phase rotation correction, wherein when the calculated amount of phase rotation correction is out of a defined range, the calculated amount of phase rotation correction that is out of the defined range is not used; and
   demodulating the received signal using the corrected phase rotation of the symbol point.

2. The phase rotation correcting method according to claim 1, wherein
   the recognizing is performed by comparing an absolute value of an I value of the symbol point with a threshold value and by comparing an absolute value of a Q value of the symbol point with the threshold value; and
   the calculating includes multiplying the Q value of the symbol point, whose phase has been rotated toward an I axis direction, by a constant depending on a phase-rotated position of the symbol point and obtaining a multiplication result as the amount of phase rotation correction.

3. The phase rotation correcting method according to claim 1, wherein the calculating includes averaging the calculated amounts of phase rotation correction.

4. The phase rotation correcting method according to claim 1, wherein:
   the recognizing of the position of the symbol point of the received signal on the IQ plane is performed by using a threshold value, and
   the phase rotation includes multiplying an amplitude of the symbol point by a number depending on the recognized position and rotating the symbol point having the multiplied amplitude toward one of the I axis and the Q axis.

5. A wireless communication apparatus comprising:
   a receiver that receives a signal modulated by a multi-value modulation method; and
   circuitry configured to:
      recognize a position of a symbol point of the received signal on an IQ plane;
      perform phase rotation by rotating a phase of the symbol point of the received signal toward one of an I axis and a Q axis depending on the recognized position, and calculate an amount of phase rotation correction as a value along an axis different from the axis toward which the phase of the symbol point has been rotated in the phase rotation;
      correct the phase rotation of the symbol point based on the calculated amount of phase rotation correction, wherein when the calculated amount of phase rotation correction is out of a defined range, the calculated amount of phase rotation correction that is out of the defined range is not used; and
      demodulate the receive signal using the corrected phase rotation of the symbol point.

6. The wireless communication apparatus according to claim 5, wherein the circuitry:
   recognizes the position of the symbol point by comparing an absolute value of an I value of the symbol point with a threshold value and by comparing an absolute value of a Q value of the symbol point with the threshold value; and
   calculates the amount of phase rotation correction by multiplying the Q value of the symbol point, whose phase has been rotated toward an I axis direction, by a constant depending on a phase-rotated position of the symbol point and obtaining a multiplication result as the amount of phase rotation correction.

7. The wireless communication apparatus according to claim 5, wherein the circuitry calculates the amount of phase rotation correction by averaging the calculated amounts of phase rotation correction.

8. The wireless communication apparatus according to claim 4, wherein the circuitry:
   recognizes the position of the symbol point of the received signal on the IQ plane by using a threshold value, and
   performs the phase rotation by multiplying an amplitude of the symbol point by a number depending on the recognized position and by rotating the symbol point having the multiplied amplitude toward one of the I axis and the Q axis.

* * * * *